(12) United States Patent
Nunokawa

(10) Patent No.: US 11,881,603 B2
(45) Date of Patent: Jan. 23, 2024

(54) FUEL CELL SYSTEM, AND METHOD OF ESTIMATING HUMIDITY IN EXHAUST GAS THEREFROM

(71) Applicant: SUBARU CORPORATION, Tokyo (JP)

(72) Inventor: Takumi Nunokawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 43 days.

(21) Appl. No.: 17/114,067

(22) Filed: Dec. 7, 2020

(65) Prior Publication Data

US 2021/0226236 A1 Jul. 22, 2021

(30) Foreign Application Priority Data

Jan. 16, 2020 (JP) ................................. 2020-004839

(51) Int. Cl.
*H01M 8/04492* (2016.01)
*H01M 8/0432* (2016.01)
(Continued)

(52) U.S. Cl.
CPC ..... *H01M 8/04522* (2013.01); *H01M 8/0435* (2013.01); *H01M 8/0441* (2013.01);
(Continued)

(58) Field of Classification Search
CPC ... H01M 8/04; H01M 8/04082–04179; H01M 8/04298–04313; H01M 8/0435;
(Continued)

(56) References Cited

U.S. PATENT DOCUMENTS

2005/0255340 A1* 11/2005 Watanabe ........... H01M 8/0247
429/444
2006/0263652 A1* 11/2006 Logan ............... H01M 8/04358
429/442
(Continued)

FOREIGN PATENT DOCUMENTS

JP 2005-222854 A 8/2005
JP 2006092801 A * 4/2006 ............. Y02E 60/50
(Continued)

OTHER PUBLICATIONS

Cha, S (2016). Fuel cell Fundamentals. (3rd ed.) (pp. 272-294, 346, 431-449). (Year: 2016).*
(Continued)

*Primary Examiner* — Jonathan Crepeau
*Assistant Examiner* — Jacob Buchanan
(74) *Attorney, Agent, or Firm* — TROUTMAN PEPPER HAMILTON SANDERS LLP

(57) ABSTRACT

A fuel cell system includes a mass flow rate measuring unit, an oxygen consumption mass flow rate acquiring unit, an exhaust-side air temperature acquiring unit, and an exhaust-side air humidity estimating unit. The mass flow rate measuring unit measures a first mass flow rate of intake-side air and a second mass flow rate of exhaust-side air. The oxygen consumption mass flow rate acquiring unit acquires a mass flow rate of oxygen consumption. The exhaust-side air humidity estimating unit estimate humidity in the exhaust-side air, on the basis of a difference between a flow rate of intake gas in the fuel cell system and a flow rate of exhaust gas from the fuel cell system, and the mass flow rate of the oxygen consumption.

15 Claims, 6 Drawing Sheets

(51) Int. Cl.
*H01M 8/0438* (2016.01)
*H01M 8/04828* (2016.01)

(52) U.S. Cl.
CPC ... *H01M 8/04395* (2013.01); *H01M 8/04507* (2013.01); *H01M 8/04835* (2013.01); *H01M 2250/20* (2013.01)

(58) Field of Classification Search
CPC .......................... H01M 8/0438–04432; H01M 8/04492–04529; H01M 8/04746–04783; H01M 8/04828–0485
See application file for complete search history.

(56) References Cited

U.S. PATENT DOCUMENTS

| | | | | |
|---|---|---|---|---|
| 2006/0263653 | A1* | 11/2006 | Sinha | H01M 8/04768 429/444 |
| 2009/0162710 | A1* | 6/2009 | Kajiwara | H01M 8/04589 429/415 |
| 2010/0233554 | A1* | 9/2010 | Nogi | H01M 8/0662 429/483 |
| 2012/0148927 | A1* | 6/2012 | Jeon | H01M 8/04828 429/414 |

FOREIGN PATENT DOCUMENTS

| | | |
|---|---|---|
| JP | 2007-172971 A | 7/2007 |
| JP | 2008-27674 A | 2/2008 |
| JP | 2008-305700 A | 12/2008 |
| JP | 2009-74586 A | 4/2009 |
| JP | 2014-225472 A | 12/2014 |

OTHER PUBLICATIONS

Machine translation of Kokubo, JP-2006092801-A. Originally available Apr. 6, 2006. (Year: 2006).*
Notice of Reasons for Refusal issued in Japanese Patent Application No. 2020-004839 dated Sep. 5, 2023, with machine translation.

* cited by examiner

FUEL CELL SYSTEM, AND METHOD OF ESTIMATING HUMIDITY IN EXHAUST GAS THEREFROM

CROSS-REFERENCE TO RELATED APPLICATIONS

This application claims priority from Japanese Patent Application No. 2020-004839 filed on Jan. 16, 2020, the entire contents of which are hereby incorporated by reference.

BACKGROUND

The disclosure relates to a fuel cell system applicable to, for example, vehicles, and a method of estimating humidity in exhaust gas from the fuel cell system.

In the modern society, vehicles are indispensable transportation, and various vehicles are moving along the roads in our daily lives. Such vehicles have used batteries such as lead storage batteries and lithium ion batteries, but in recent years, fuel cells are gaining attention as a substitute for lead storage batteries and lithium ion batteries for their relatively small impact on the natural environment.

SUMMARY

An aspect of the technology provides a fuel cell system configured to perform power generation by reaction of oxygen and hydrogen. The fuel cell system includes a mass flow rate measuring unit, an oxygen consumption mass flow rate acquiring unit, an exhaust-side air temperature acquiring unit, and an exhaust-side air humidity estimating unit. The mass flow rate measuring unit is configured to measure a first mass flow rate of intake-side air on intake side of a fuel cell and a second mass flow rate of exhaust-side air on exhaust side of the fuel cell. The oxygen consumption mass flow rate acquiring unit is configured to acquire a mass flow rate of oxygen consumption in the fuel cell. The exhaust-side air temperature acquiring unit is configured to acquire a temperature value of the exhaust-side air. The exhaust-side air humidity estimating unit is configured to estimate humidity in the exhaust-side air, on the basis of a difference between a flow rate of intake gas in the fuel cell system and a flow rate of exhaust gas from the fuel cell system, and the mass flow rate of the oxygen consumption.

An aspect of the technology provides a method of estimating humidity in exhaust-side air on exhaust side of a fuel cell in a fuel cell system. The method includes: acquiring a first mass flow rate of intake-side air on intake side of the fuel cell and a second mass flow rate of the exhaust-side air on the exhaust side of the fuel cell; acquiring a mass flow rate of oxygen consumption in the fuel cell; acquiring a temperature value of the exhaust-side air; and estimating humidity in the exhaust-side air, on the basis of a difference between a flow rate of intake gas in the fuel cell system and a flow rate of exhaust gas from the fuel cell system, and the mass flow rate of the oxygen consumption.

An aspect of the technology provides a fuel cell system configured to perform power generation by reaction of oxygen and hydrogen. The fuel cell system includes a mass flow rate sensor, a temperature sensor, and circuitry. The mass flow rate sensor is configured to measure a first mass flow rate of intake-side air on intake side of a fuel cell or a second mass flow rate of exhaust-side air on exhaust side of the fuel cell, or both. The temperature sensor is configured to acquire a temperature value of the exhaust-side air. The circuitry is configured to acquire a mass flow rate of oxygen consumption in the fuel cell. The circuitry is configured to estimate humidity in the exhaust-side air, on the basis of a difference between a flow rate of intake gas in the fuel cell system and a flow rate of exhaust gas from the fuel cell system, and the mass flow rate of the oxygen consumption.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
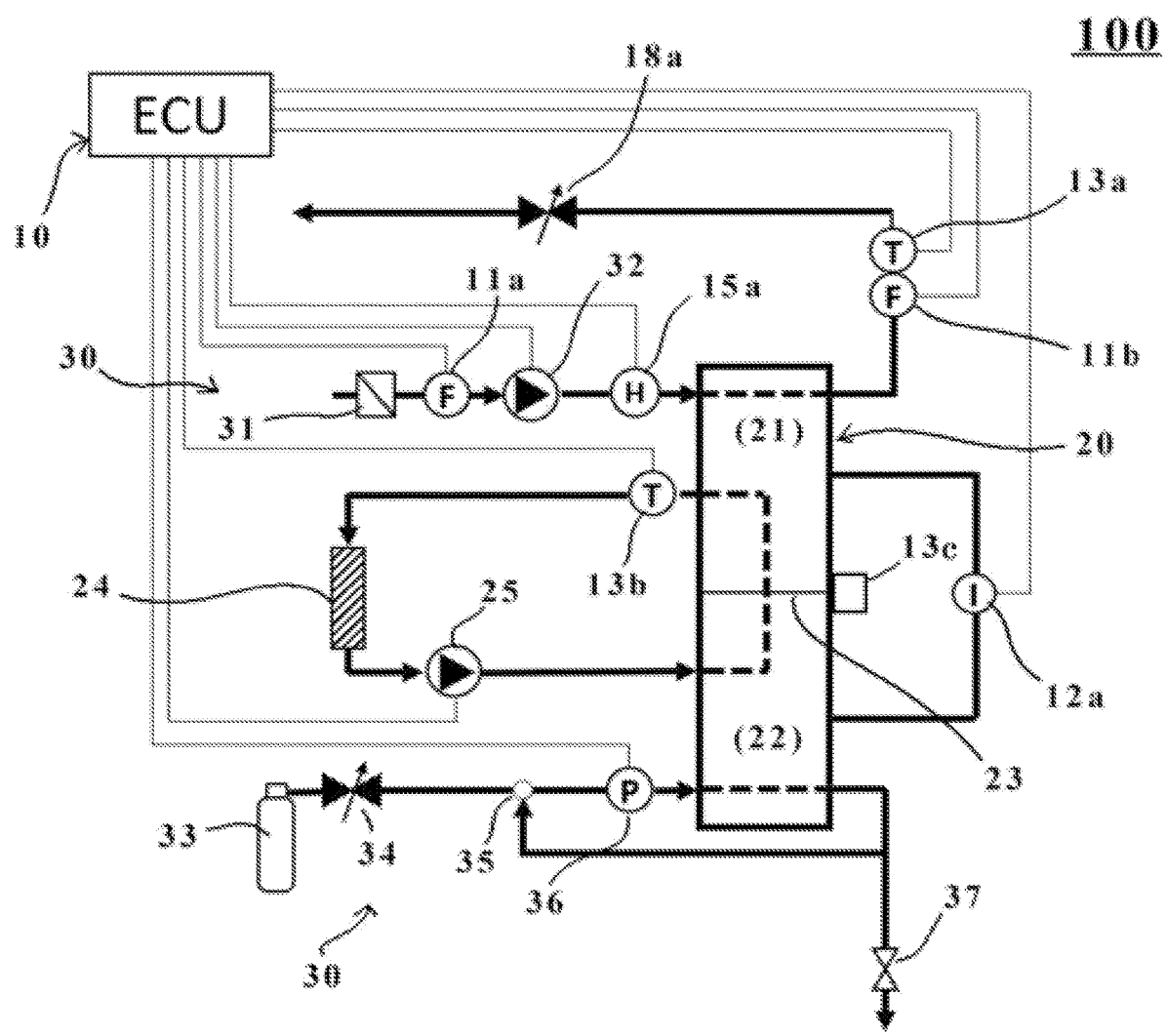
FIG. 1 is an overall block diagram of a fuel cell system according to an embodiment of the disclosure.

Fuel cells include a pair of electrodes, i.e., a fuel electrode and an air electrode, and produce electric energy by reaction of hydrogen supplied to the fuel electrode, and oxygen supplied to the air electrode. Fuel cells further include solid electrolyte, and a moisture control of the solid electrolyte is important.

Existing techniques, however, fail to appropriately meet the needs of the market and still have the following disadvantages.

For example, in Japanese Unexamined Patent Application Publication (JP-A) No. 2008-305700, a humidifier is disposed near an inlet of a fuel cell. On the basis of a temperature near the humidifier and a temperature inside the fuel cell, humidity in the air flowing an intake system, or an air supply path, of the fuel cell is estimated, to provide sufficient power generation performance.

Humidity in the air on exit side of the fuel cell include moisture generated in accompaniment with power generation. Accordingly, humidity on the air supply path side of the fuel cell and humidity on air exhaust path side are expected to take different values. Because a key factor in state management of the fuel cell is the moisture control of the electrolyte, using the humidity in the air exhaust path after passage through the electrolyte may be sometimes more desirable.

It is desirable to provide a fuel cell system and a method of estimating humidity in exhaust gas therefrom that make it possible to acquire, with a simple configuration, humidity in exhaust gas effective for state management of a fuel cell.

In the following, some preferred but non-limiting embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated. Other configurations than described in detail below may be complemented as appropriate by component technology and configurations regarding known fuel cell systems including patent documents such as JP-A No. 2008-305700 as mentioned above.

<Fuel Cell System 100>

First, referring to FIG. 1, description is given of a configuration of a fuel cell system 100 according to a preferred but non-limiting embodiment of the disclosure. The fuel cell system 100 in the embodiment may be installed in, for example, a fuel cell vehicle (FCV). In the following, description is given of a case where the fuel cell system 100 is applied to the FCV, but the embodiments of the disclosure are suitable not only for FCVs but also for stationary cell systems such as housing equipment and mobile cell systems such as aircrafts.

The fuel cell system 100 to be installed in the FCV may include, for example, a controller 10, a fuel cell 20, and a gas supply unit 30. The controller 10 may include an ECU (electronic control unit), and control each part of the vehicle. The fuel cell 20 may be controlled by the controller 10. The gas supply unit 30 may supply anode gas and cathode gas to the fuel cell 20.

The gas supply unit 30 in this embodiment may include, for example, an air filter 31 and a hydrogen tank 33. The air filter 31 may serve as a cathode gas supply unit that supplies the air to cathode electrode side of the fuel cell 20. The hydrogen tank 33 may supply hydrogen gas to anode electrode side of the fuel cell 20.

As illustrated in FIG. 1, the air taken from outside the vehicle through the air filter 31 is compressed by a compressor 32. The compressed air is sent to an oxygen electrode 21, i.e., an air electrode, of the fuel cell 20 through an air supply path. In one example, at this occasion, the compressed air may be humidified by a known humidifier (undepicted). After oxygen is consumed by electrochemical reaction inside the fuel cell 20, the resultant air is discharged to outside the system through an exhaust path, while having its pressure adjusted by an air pressure regulating valve 18a.

It is to be noted that pressure of the air to be supplied to the oxygen electrode 21 may be detected by a known air pressure gauge (undepicted) provided near an inlet of the oxygen electrode 21 in the fuel cell 20. The air pressure regulating valve 18a may be controlled by the controller 10 to bring the air pressure thus detected to predetermined pressure.

Various modes are available for humidification of the air to be supplied to the fuel cell 20. Examples may include using a water vapor exchange membrane, and using known various devices such as a membrane humidifier and an atomizer. The water vapor exchange membrane may reuse moisture in the air discharged. The membrane humidifier and the atomizer may supply moisture such as pure water to the air.

The fuel cell system 100 in this embodiment may include a mass flow rate sensor 11a on a supply path of intake-side air to be supplied to the fuel cell 20. The mass flow rate sensor 11a may measure a mass flow rate of the intake-side air. In one embodiment of the disclosure, the mass flow rate sensor 11a may serve as a "mass flow rate measuring unit". In one specific but non-limiting example, in the embodiment, the mass flow rate sensor 11a may be provided on upstream side of the compressor 32 on the supply path as mentioned above, and on downstream side of the air filter 31.

The fuel cell system 100 in this embodiment may also include a humidity sensor 15a on the supply path of the intake-side air to be supplied to the fuel cell 20. The humidity sensor 15a may measure humidity, i.e., an amount of water vapor, or an amount of moisture, in the intake-side air. In one embodiment of the disclosure, the humidity sensor 15a may serve as an "intake-side humidity measuring unit". It is to be noted that the humidity sensor 15a is optional and may be omitted, as appropriate, under predetermined conditions described later.

The fuel cell system 100 in this embodiment may include a mass flow rate sensor 11b on the exhaust path of exhaust-side air to be discharged from the fuel cell 20. The mass flow rate sensor 11b may measure a mass flow rate of the exhaust-side air. In one embodiment of the disclosure, the mass flow rate sensor 11b may serve as the "mass flow rate measuring unit". In one specific but non-limiting example, in the embodiment, the mass flow rate sensor 11b may be provided on upstream side of the air pressure regulating valve 18a on the exhaust path as mentioned above.

The mass flow rate sensors 11a and 11b may include, as appropriate, whatever are suitable for FCVs, out of various kinds of known mass flow sensors such as Coriolis flow meters and thermal mass flow meters.

In one example, the fuel cell system 100 in this embodiment may include a temperature sensor 13a on the exhaust path of the exhaust-side air to be discharged from the fuel cell 20. The temperature sensor 13a may measure a temperature of the exhaust-side air. In one embodiment of the disclosure, the temperature sensor 13a may serve as an "exhaust-side air temperature acquiring unit". It is to be noted that the temperature sensor 13a is optional and may be omitted, as appropriate, under predetermined conditions described later.

As illustrated in FIG. 1, hydrogen supplied from the hydrogen tank 33 passes through a hydrogen supply path, is regulated to desired pressure by a hydrogen pressure regulating valve 34, and thereafter, is sent to a hydrogen electrode 22, i.e., a fuel electrode, of the fuel cell 20. The hydrogen electrode 22 as described above is opposed to the oxygen electrode 21 with an electrolyte membrane 23 in between. The electrolyte membrane 23 may include, for example, a solid polymer electrolyte membrane. At this occasion, humidification may be performed on hydrogen to be sent to the hydrogen electrode 22 by using a known humidifier (undepicted). It is to be noted that in a hydrogen gas supply unit in this embodiment, nitrogen and impurities accumulate. Nitrogen is permeated from the oxygen electrode 21 to the hydrogen electrode 22 during power generation. Impurities are contained in the hydrogen tank 33. Accordingly, in one example, a discharge path and a discharge valve 37 may be provided, to discharge these impurities to outside the system.

After hydrogen is consumed by the electrochemical reaction inside the fuel cell 20, hydrogen supplied in excess to the hydrogen electrode 22 may be reused and sent again to the hydrogen supply path by a hydrogen circulator 35 through a hydrogen circulation path. Pressure of hydrogen to be supplied to the hydrogen electrode 22 may be detected by a pressure gauge 36 provided in the vicinity of an inlet of the hydrogen electrode 22. The hydrogen pressure regulating valve 34 may be controlled by the controller 10 to bring the detected pressure of hydrogen to predetermined pressure. It is to be noted that non-limiting examples of such hydrogen pressure regulation may include allowing an ECU of the vehicle to control an amount of hydrogen injection from an injector to provide the predetermined pressure as mentioned above, or allowing the hydrogen pressure regulating valve 34 to make a mechanical pressure control.

A cooling water unit may be provided to cool heat generated by the power generation of the fuel cell 20 to keep a cell body at an appropriate temperature. In one example, cooling water, i.e., a coolant, pressurized and sent by a cooling water pump 25 passes through the fuel cell 20 to absorb the heat, and thereafter, is sent to a known heat exchanger 24 such as a radiator through a circulation path of the cooling water. Thus, the heat as mentioned above is discharged to outside the unit by the heat exchanger 24. Thereafter, the cooling water is again pumped for circulation to the fuel cell 20 by the cooling water pump 25.

The fuel cell system 100 in the embodiment may further include a thermometer 13b. The thermometer 13b may detect a temperature of the cooling water discharged from the fuel cell 20. Thus, the controller 10 may perform a control of adjusting a temperature Tfcv of the fuel cell 20 to an appropriate temperature for the power generation, while monitoring the water temperature of the cooling water that has passed through the fuel cell 20 with the thermometer 13b.

Non-limiting examples of a load device that consumes electric power generated by the fuel cell 20 may include an inverter device configured to supply electric power to a driving motor of the FCV. A voltage to be generated by the fuel cell 20 may be detected by an undepicted voltmeter. A current to be supplied from the fuel cell 20 to, for example, the inverter device may be detected by an ammeter 12a.

(Controller 10)

Figure 2:
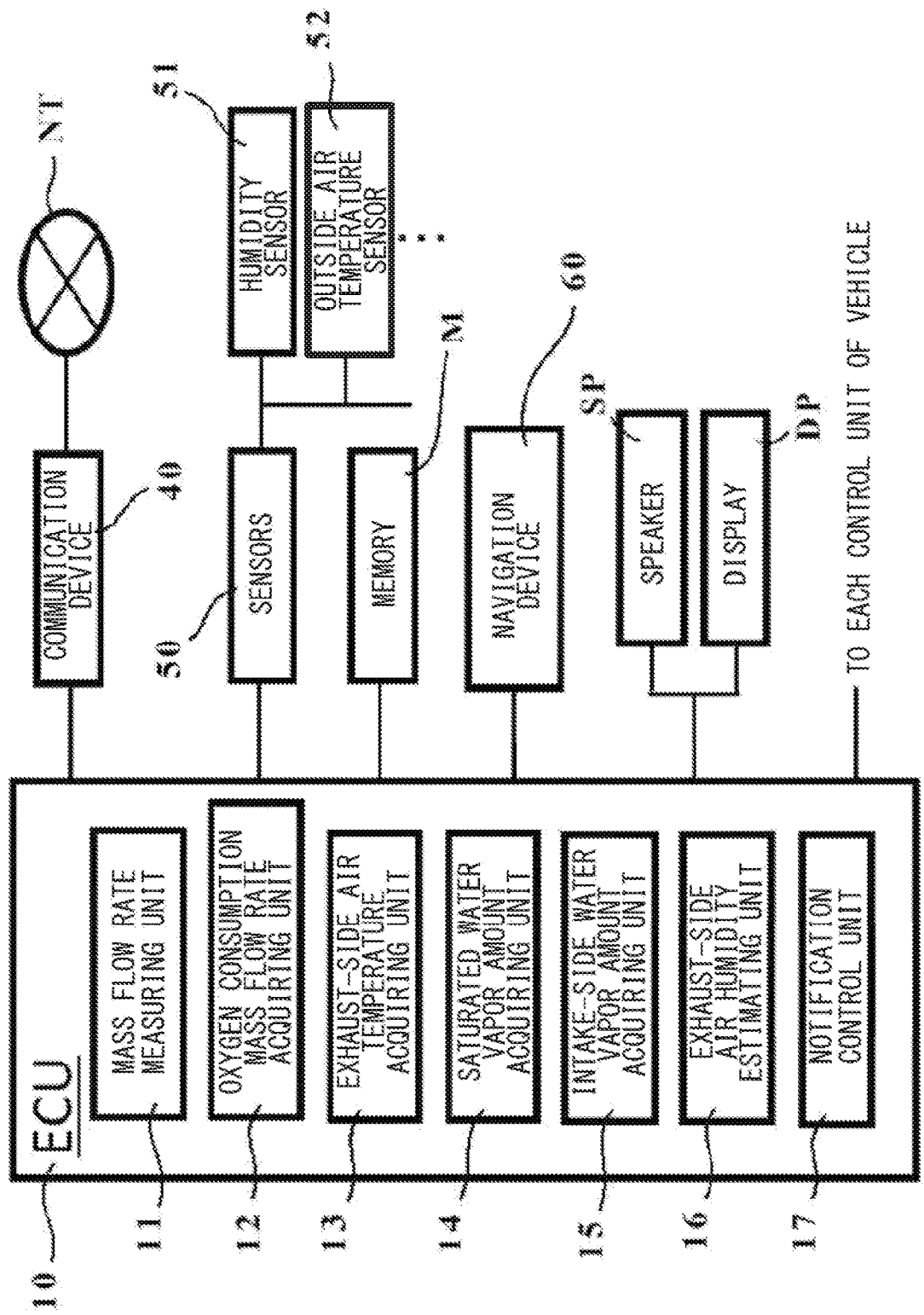
FIG. 2 is a block diagram of a controller, or an ECU (Electronic Control Unit), according to the embodiment.

Description is given next, with reference to FIG. 2, of a configuration of the controller 10 in the fuel cell system 100 in this embodiment.

As illustrated in FIG. 2, the controller 10 in this embodiment may include a mass flow rate measuring unit 11, an oxygen consumption mass flow rate acquiring unit 12, an exhaust-side air temperature acquiring unit 13, a saturated water vapor amount acquiring unit 14, an intake-side water vapor amount acquiring unit 15, an exhaust-side air humidity estimating unit 16, and a notification control unit 17. The controller 10 may include, for example, a known computer device such as a CPU (central processing unit) including, for example, an undepicted memory. The controller 10 may make an overall control of the fuel cell system 100.

In one example, as illustrated in the figure, the controller 10 is configured to be connectable to an external network such as the Internet through a communication device 40. The communication device 40 may include, for example, a known on-vehicle communication device configured to perform information communication with outside the FCV. The external network is not limited to the Internet as mentioned above. Non-limiting examples of the external network may include an information communication network from a base station that transmits, by wireless communication, various kinds of information such as traffic congestion information and road traffic information.

The controller 10 is configured to receive various signals from sensors 50 mounted on the FCV. The sensors 50 may be mounted on the FCV to detect various kinds of information. In this embodiment, non-limiting examples may include a humidity sensor 51 and an outside air temperature sensor 52. In an alternative, known on-vehicle sensors may be applicable, e.g., an illuminance sensor or a road surface sensor. Furthermore, the controller 10 is configured to communicate with a known navigation device 60, a speaker SP, and a display DP. The navigation device 60, the speaker SP, and the display DP may be mounted on the FCV.

It is to be noted that in this embodiment, the humidity sensor 51 and the outside air temperature sensor 52 are illustrated in the figure, but the known sensors as mentioned above may be selected or omitted, as appropriate, to provide desired functions.

The mass flow rate measuring unit 11 may measure a mass flow rate WF1 of the intake-side air on intake side of the fuel cell 20 and a mass flow rate WF2 of the exhaust-side air on exhaust side of the fuel cell 20. In one embodiment of the disclosure, the mass flow rate measuring unit 11 may serve as a "mass flow rate measuring unit". In one example, the mass flow rate measuring unit 11 may acquire the mass flow rate WF1 of the intake-side air from the mass flow rate sensor 11a, and the mass flow rate WF2 of the exhaust-side air from the mass flow rate sensor 11b. The mass flow rate sensor 11a may be electrically coupled to the controller 10. Similarly, the mass flow rate sensor 11b may be electrically coupled to the controller 10. In one embodiment of the disclosure, the mass flow rate sensor 11a may serve as a "first mass flow rate sensor". In one embodiment of the disclosure, the mass flow rate sensor 11b may serve as a "second mass flow rate sensor".

It is to be noted that in this embodiment, the mass flow rate is directly measured by using the mass flow rate sensor. Alternatively, for example, a volume flow rate may be measured by using a known volume flow rate sensor, and thereafter, the volume flow rate may be converted into a mass flow rate by a known method. As described above, the mass flow rate sensor 11a or the mass flow rate sensor 11b, or both, may be replaced with known volume flow rate sensors.

The oxygen consumption mass flow rate acquiring unit 12 is configured to acquire a mass flow rate Ow of oxygen consumption in the power generation in the fuel cell 20. In one embodiment of the disclosure, the oxygen consumption mass flow rate acquiring unit 12 may serve as an "oxygen consumption mass flow rate acquiring unit". In one example, in this embodiment, the oxygen consumption mass flow rate acquiring unit 12 may calculate the mass flow rate Ow of the oxygen consumption, on the basis of a current value measured by the ammeter 12a. The ammeter 12a may be electrically coupled to the controller 10. In this embodiment, the calculation of the mass flow rate Ow of the oxygen consumption may be made with the use of a theoretical expression: $4H^+ + O_2 + 4e^- \rightarrow 2H_2O$. Alternatively, regarding the mass flow rate Ow, a relational expression may be calculated by experiment or simulation and held in advance. The relational expression represents relation of oxygen and hydrogen to be consumed in the power generation in the fuel cell 20, and electrical energy, i.e., an amount of charges. On the basis of the relational expression thus held, current density, and effective reaction area, the mass flow rate of the oxygen consumption may be calculated by a known method from the amount of charges given as: Coulomb (C)=current value (A)×second (s).

The exhaust-side air temperature acquiring unit 13 is configured to acquire a temperature value Tout of the exhaust-side air on the exhaust side of the fuel cell 20 as mentioned above. In one embodiment of the disclosure, the exhaust-side air temperature acquiring unit 13 may serve as an "exhaust-side air temperature acquiring unit". In one example, the exhaust-side air temperature acquiring unit 13 may acquire the temperature value Tout of the exhaust-side air measured by the temperature sensor 13a disposed on the exhaust path as mentioned above.

Alternatively, in a case where the fuel cell system 100 is devoid of the temperature sensor 13a as mentioned above, the temperature value Tout of the exhaust-side air may be substituted by a temperature value of the thermometer 13b configured to detect the temperature of the cooling water discharged from the fuel cell 20. One reason for this may be that the temperature of the cooling water immediately after being discharged from the fuel cell 20 is considered as equivalent to the temperature of the exhaust-side air.

The saturated water vapor amount acquiring unit 14 is configured to acquire an amount of saturated water vapor at a predetermined temperature from a saturated water vapor curve data held in advance by a memory M. The memory M may be electrically coupled to the controller 10. It is to be noted that the saturated water vapor curve data held by the memory M represents, for example, relation of the amount of the saturated water vapor and an air temperature, i.e., the temperature. The relation may be set on the basis of a known conversion formula such as the Tetens formula and the Wagner formula.

The intake-side water vapor amount acquiring unit 15 may acquire an amount of water vapor, i.e., an amount of moisture, contained in the intake-side air to be supplied to the fuel cell 20. In one example, the intake-side water vapor amount acquiring unit 15 is configured to acquire the amount of water vapor, i.e., the amount of moisture, measured by the humidity sensor 15a. The humidity sensor 15a may be provided on the supply path of the fuel cell 20, as mentioned above. In one embodiment of the disclosure, the humidity sensor 15a may serve as the "intake-side humidity measuring unit".

The exhaust-side air humidity estimating unit 16 is configured to estimate humidity Hout in the exhaust-side air, on the basis of a difference between a flow rate of intake gas in the fuel cell system 100 and a flow rate of exhaust gas from the fuel cell system 100, and the mass flow rate Ow of the oxygen consumption as mentioned above. In one embodiment of the disclosure, the exhaust-side air humidity estimating unit 16 may serve as an "exhaust-side air humidity estimating unit". In one example, the exhaust-side air humidity estimating unit 16 in this embodiment may perform processing α to γ described below as an example.

The processing α may include subtracting, from the mass flow rate WF2 of the exhaust-side air as mentioned above, a value obtained by subtracting the mass flow rate Ow of the oxygen consumption from the mass flow rate WF1 of the intake-side air, to calculate a flow rate WVout of water vapor in the exhaust-side air.

The processing β may include acquiring the amount of saturated water vapor a(T)out in the exhaust-side air, corresponding to the acquired temperature value Tout of the exhaust-side air.

The processing γ may include estimating the humidity Hout in the exhaust-side air, on the basis of a ratio (WVout/a(T)out) of the flow rate WVout of the water vapor in the exhaust-side air to the amount of the saturated water vapor a(T)out in the exhaust-side air.

At this occasion, the exhaust-side air humidity estimating unit 16 is configured to determine the amount, i.e., the mass flow rate, of the water vapor, i.e., moisture, contained in the intake-side air on the basis of the temperature Tfcv of the fuel cell 20.

Moreover, in a case where the fuel cell system 100 includes the humidity sensor 15a as mentioned above, the exhaust-side air humidity estimating unit 16 may subtract the flow rate of the water vapor contained in the intake-side air from the mass flow rate WF1 as mentioned above, on the basis of the humidity measured by the humidity sensor 15a. In one embodiment of the disclosure, the humidity sensor 15a may serve as the "intake-side humidity measuring unit".

The notification control unit 17 is configured to control notification through the speaker SP and the display DP as mentioned above. For example, the notification control unit 17 is configured to make the notification of states of the fuel cell 20 through the speaker SP and the display DP, on the basis of an estimation result of the humidity Hout in the exhaust-side air by the exhaust-side air humidity estimating unit 16. Hence, in a case where any failure in the fuel cell 20 is detected on the basis of the estimation result of the humidity Hout, it is possible to quickly transmit information regarding an abnormality to, for example, an occupant.

Moreover, the estimation result of the humidity Hout in the exhaust-side air by the exhaust-side air humidity estimating unit 16 may be utilized in a status control of the FCV including the fuel cell system 100. For example, in a case where the humidity Hout as mentioned above is low, a humidification control may be performed on the intake side. In contrast, in a case where the humidity Hout is high, a drying control may be performed. Non-limiting examples of methods of the humidification control and the drying control may include raising and decreasing the temperature in the fuel cell 20, and controlling the flow rate of the intake gas and/or supercharging pressure.

<Method of Estimating Humidity in Exhaust Gas>

Figure 3:
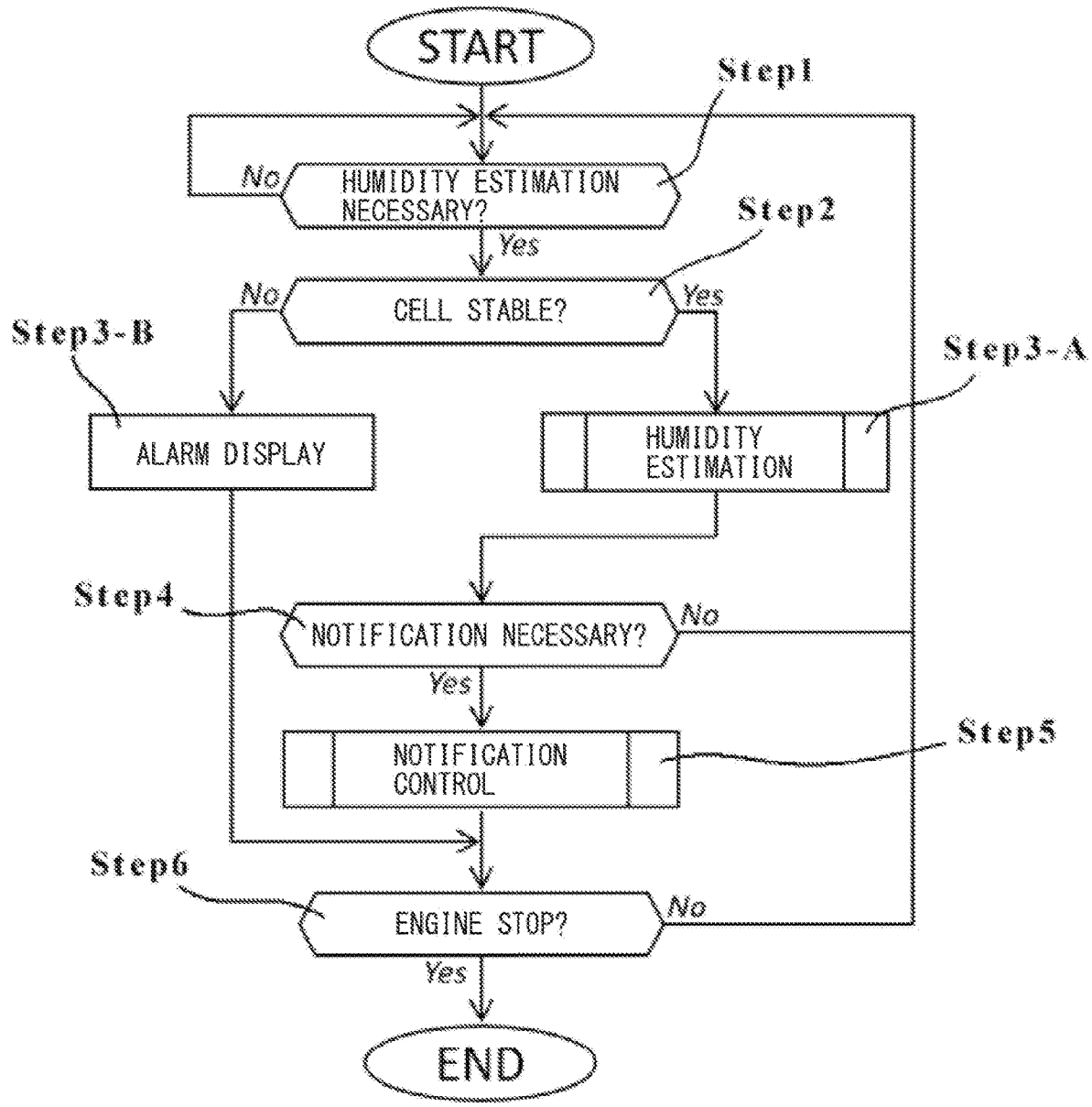
FIG. 3 is a flowchart illustrating a method of estimating humidity in exhaust gas according to the embodiment.
Figure 4:
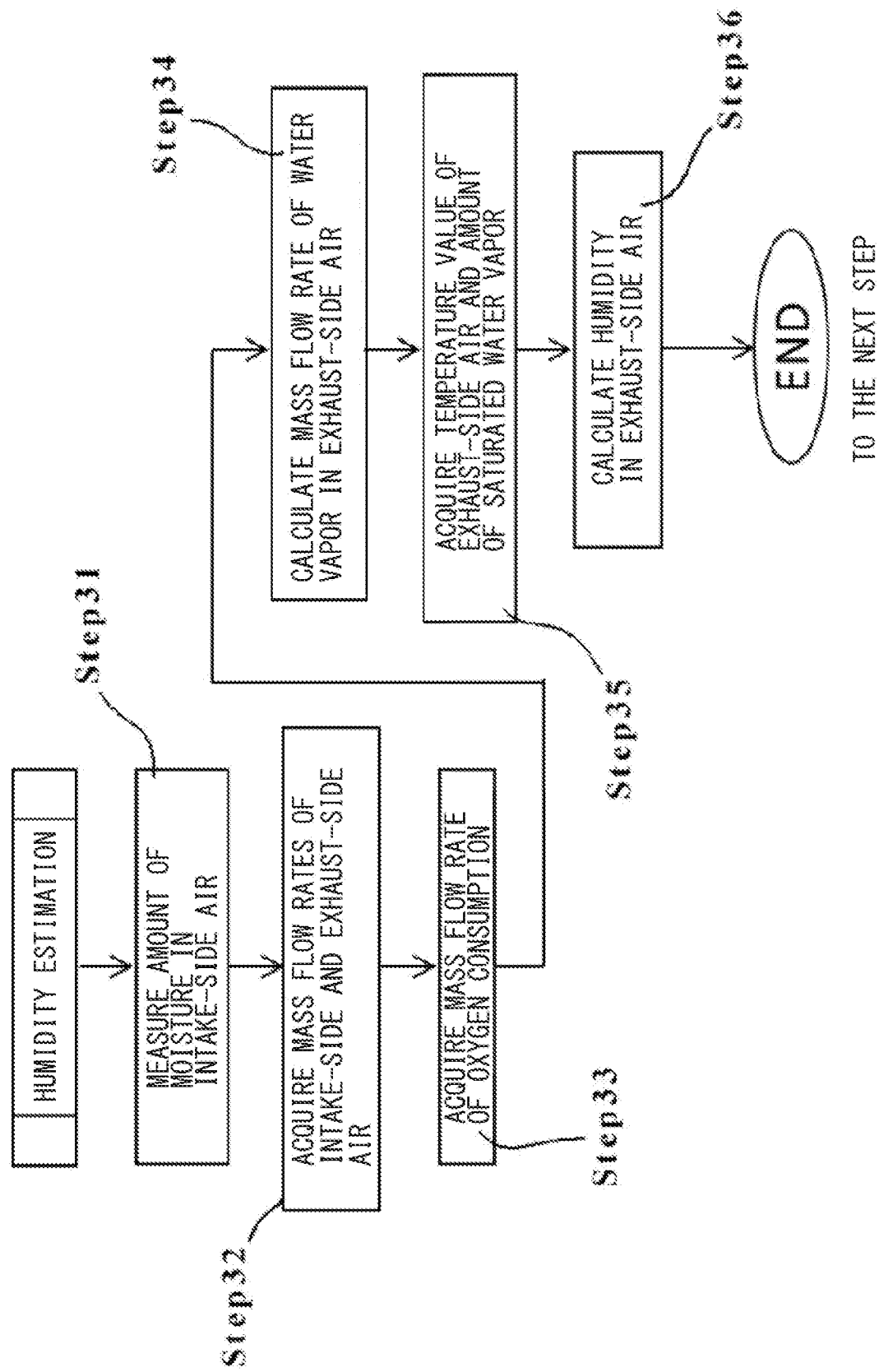
FIG. 4 is a flowchart illustrating an example of humidity estimation in the flowchart illustrated in FIG. 3.
Figure 5:
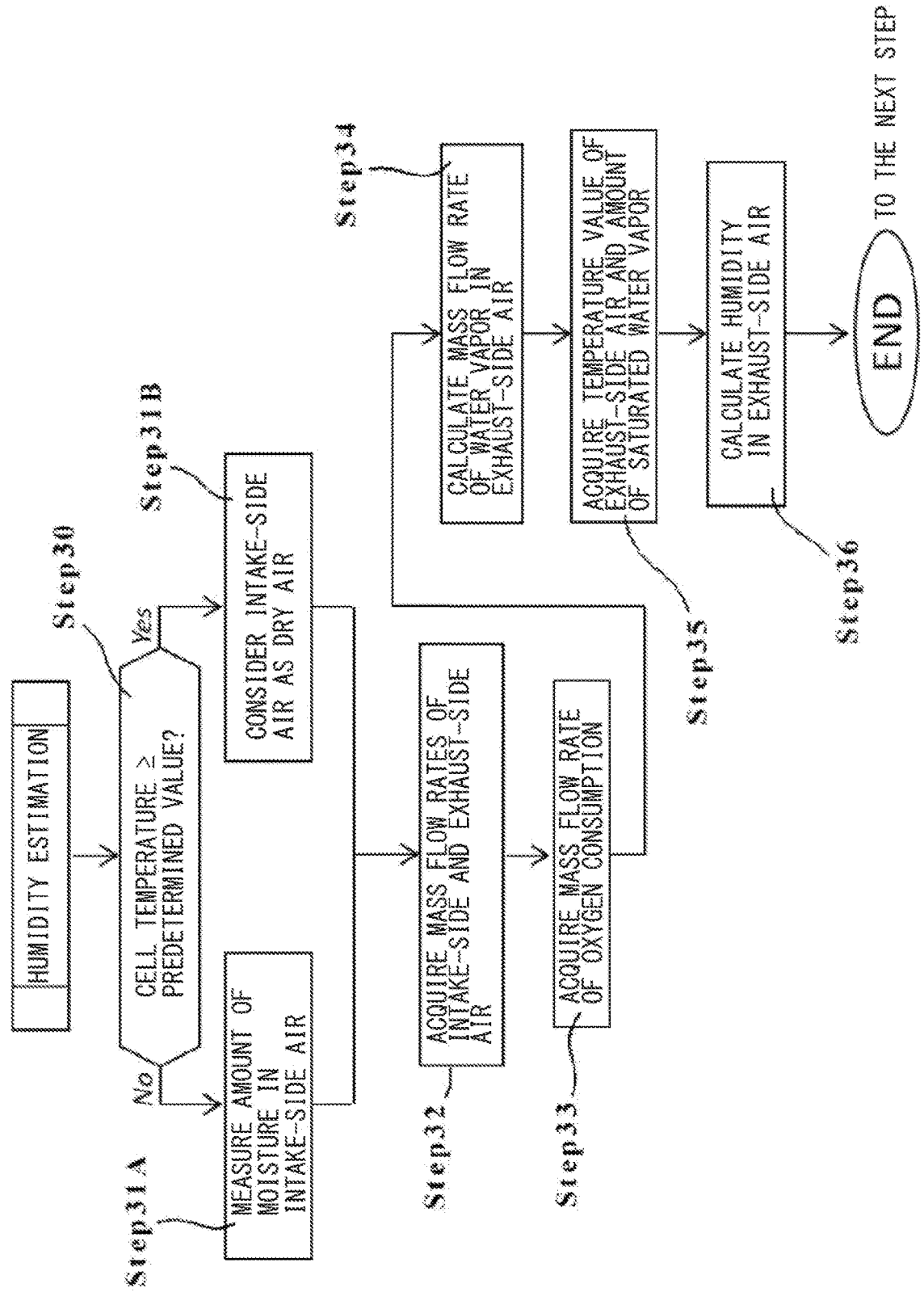
FIG. 5 is a flowchart illustrating another example of the humidity estimation in the flowchart illustrated in FIG. 3.

Description is given next, with reference to FIGS. 3 to 5 as appropriate, of a method of estimating humidity in the exhaust gas from the fuel cell system 100 in this embodiment.

As illustrated in FIG. 3, first, in step 1, a determination may be made as to whether to estimate the humidity in the exhaust-side air on the exhaust side of the fuel cell 20. In step 1, in a case with a determination that humidity estimation is necessary (Yes in step 1), the flow may proceed to subsequent step 2. The determination that the humidity estimation is necessary may be made, for example, automatically on predetermined cycles, or alternatively, the determination may be made in response to an input indicating that the humidity estimation is necessary. Such an input may be made manually by, for example, an occupant.

Thereafter, in step 2, a determination may be made as to whether the fuel cell 20 is stable. In a case where the fuel cell 20 is stable, for example, in a case where a certain period of time has passed after a start-up of the fuel cell system 100 (Yes in step 2), the flow may proceed to step 3-A. In a case where the fuel cell 20 is unstable, for example, immediately after the start-up of the fuel cell system 100 (No in step 2), the flow may proceed to step 3-B. In step 3-B, alarm display may be provided on the display DP as mentioned above, indicating that, for example, the humidity estimation is unavailable at present.

It is to be noted that step 2 is optional and may be omitted as appropriate, because in some cases, the humidity immediately after the start-up of the fuel cell system 100 is estimated.

(Humidity Estimation Processing, Part 1)

In step 3-A, the controller 10 as mentioned above may execute humidity estimation processing in the exhaust-side air, as illustrated in, for example, FIG. 4, to carry out state management of the fuel cell 20.

That is, as illustrated in FIG. 4, in the humidity estimation processing, first, in step 31, an amount of moisture in the intake-side air may be measured. In one embodiment of the disclosure, step 31 may serve as "measuring an amount of water vapor in the intake-side air". In one example, the amount of moisture in the intake-side air may be measured on the basis of the humidity measured by the humidity sensor 15a. In one embodiment of the disclosure, the humidity sensor 15a may serve as the "intake-side humidity measuring unit".

In the humidity estimation process, part 1, in estimating the humidity in the exhaust-side air, a value obtained by subtracting the flow rate of the water vapor contained in the intake-side air, i.e., the amount of moisture of the intake-side air, from the mass flow rate WF1 measured by the mass flow rate sensor 11a may serve as the "mass flow rate WF1 of the intake-side air". It is to be noted that as with humidity estimation processing, part 2 described later, the "mass flow rate WF1 of the intake-side air" may include the flow rate of the water vapor as mentioned above, i.e., the amount of moisture in the intake-side air. For example, in a case where the fuel cell is at a sufficiently high temperature, the flow rate of the water vapor may be treated as negligible. In other words, the intake-side air may be considered dry.

Thereafter, in step 32, the mass flow rate WF1 of the intake-side air on the intake side of the fuel cell 20 and the mass flow rate WF2 of the exhaust-side air on the exhaust side of the fuel cell 20 may be acquired, respectively through the mass flow rate sensors 11a and 11b as mentioned above. In one embodiment of the disclosure, step 32 may serve as "acquiring a first mass flow rate and a second mass flow rate".

Thereafter, in step 33, the mass flow rate Ow of the oxygen consumption in the fuel cell 20 may be acquired on the basis of the current value measured by the ammeter 12a. In one embodiment of the disclosure, the ammeter 12a may serve as the "oxygen consumption mass flow rate acquiring unit". In one embodiment of the disclosure, step 33 may serve as "acquiring a mass flow rate of oxygen consumption".

Thereafter, in steps 34 to 36, the humidity estimation in the exhaust-side air may be executed, with the use of parameters obtained in steps described above, on the basis of the difference between the flow rate of the intake gas in the fuel cell system 100 and the flow rate of the exhaust gas from the fuel cell system 100, and the mass flow rate Ow of the oxygen consumption. In one embodiment of the disclosure, steps 34 to 36 may serve as "estimating humidity in the exhaust-side air".

That is, in step 34, the flow rate WVout of the water vapor in the exhaust-side air may be calculated on the basis of the expression as mentioned above: the mass flow rate WF2−(the mass flow rate WF1−the mass flow rate Ow of the oxygen consumption).

In step 35, the temperature value Tout in the exhaust-side air may be acquired by the temperature sensor 13a, while the amount of the saturated water vapor corresponding to the temperature value Tout in the exhaust-side air may be read out from the memory M. In one embodiment of the disclosure, the temperature sensor 13a may serve as the "exhaust-side air temperature acquiring unit". In one embodiment of the disclosure, step 35 may serve as "acquiring a temperature value of the exhaust-side air".

In step 36, the humidity Hout in the exhaust-side air may be estimated on the basis of the ratio (WVout/a(T)out), as mentioned above, of the flow rate WVout of the water vapor in the exhaust-side air to the amount of the saturated water vapor a(T)out in the exhaust-side air.

In the following, an example is given where the method of estimating the humidity in the exhaust gas as described above is applied to an actual vehicle.

It is assumed that the FCV including the fuel cell system 100 in this embodiment is carrying out the state management of the fuel cell 20 in a certain scene on travel. At this occasion, the parameters measured by the respective sensors as described above are assumed to have the following values.

(a) the mass flow rate WF1 acquired by the mass flow rate sensor 11a: 100 g/sec
(b) the mass flow rate WF2 acquired by the mass flow rate sensor 11b: 110 g/sec
(c) the mass flow rate Ow of the oxygen consumption derived from the current value of the ammeter 12a: 10 g/sec
(d) the temperature value Tout measured by temperature sensor 13a: 90° C.
(e) the amount of moisture in the intake-side air measured by the humidity sensor 15a: 0.3 g/sec
(f) the temperature Tfcv of the fuel cell 20: 90° C.

First, the value obtained by subtracting the mass flow rate of the water vapor from the mass flow rate of the intake-side air is calculated as the mass flow rate WF1. Thereafter, on the basis of the amount of the water vapor measured by the humidity sensor 15a, the amount of the water vapor contained in the intake-side air is subtracted from the mass flow rate WF1. Thus, the mass flow rate WF1 exclusive of the mass flow rate of the water vapor is obtained as follows: the mass flow rate WF1=100−0.3=99.7 g/sec.

Thereafter, on the basis of the expression: the mass flow rate WF2−(the mass flow rate WF1−the mass flow rate Ow of the oxygen consumption), the flow rate WVout of the water vapor in the exhaust-side air is calculated as follows: 110−99.7+10=20.3 g/sec.

Thereafter, the amount of the saturated water vapor corresponding to the temperature value Tout (90° C.) is read out from the memory M. In this case, the amount of the saturated water vapor is 421.45 g/m$^3$.

Here, gas composition of the exhaust-side air is as follows. Nitrogen: 100×0.8/28=2.9 mol, and oxygen: (100× 0.2−10)/32=0.3 mol. Moreover, the number of moles of the water vapor calculated above is given as follows: 20.3/ 18=1.1 mol.

Thus, in a case where exhaust gas pressure (estimated from a measured value or the supercharging pressure) is 240 kPa (absolute pressure), a volume flow rate of the exhaust-side air is expressed by the following expression (K) using PV=nRT.

$$240\times(\text{the volume flow rate of the exhaust-side air})= (2.9+0.3+1.1)\times8.31\times10^{-3}\times(90+273) \quad (K)$$

Thus, a value of the volume flow rate of the exhaust-side air is calculated as 0.054 m$^3$/sec. Here, the humidity in the exhaust gas [%] is given as follows: the humidity in the exhaust gas [%]=the flow rate of the water vapor [g/sec]/the flow rate of the exhaust-side air [m$^3$/sec]/the amount of the saturated water vapor [g/m³]×100. Accordingly, the estimated humidity Hout in the exhaust-side air is a numerical value (%) obtained by the following expression (L).

$$Hout=20/0.054/421.45\times100=87.8(\%) \quad (L)$$

(Humidity Estimation Processing, Part 2)

Description is given next, with reference to FIG. 5, of another example of the humidity estimation processing in this embodiment. It is to be noted that in this example, the same contents as those of the humidity estimation processing, part 1, described above are denoted by the same reference characters and description thereof is omitted as appropriate.

As illustrated in FIG. 5, in the humidity estimation processing, part 2, in this embodiment, in a case where a cell temperature of the fuel cell 20 is sufficiently high, the intake-side air is considered and dealt with as dry air, that is, the amount of moisture is substantially zero. Here, "the case where the cell temperature is sufficiently high" refers to a case where an amount of moisture in the air hardly influences the estimation of the humidity Hout in the exhaust-side air, and for example, the cell temperature may be set to 80° C. or higher.

That is, in the humidity estimation processing, part 2, first, in step 30, the temperature Tfcv of the fuel cell 20 may be acquired by a thermometer, and a determination may be made as to whether the cell temperature acquired is equal to or higher than a predetermined value. As described above, in this embodiment, the predetermined value may be set to 80° C. In one embodiment of the disclosure, the thermometer that acquires the temperature Tfcv may serve as a "cell temperature acquiring unit". In one embodiment of the disclosure, step 30 may serve as "acquiring a temperature of the fuel cell". It is to be noted that there is no limitation on whatever thermometer to use to acquire the temperature Tfcv of the fuel cell 20, and various known thermometers that can be mounted on fuel cells are applicable.

In step 30, in a case where the temperature Tfcv of the fuel cell 20 is lower than the predetermined value (No in step 30), the flow may proceed to step 31A. In step 31A, the amount of moisture in the intake-side air may be measured. It is to be noted that step 31A is the same as step 31 as described above, and description thereof is omitted.

In step 30, in a case where the temperature Tfcv of the fuel cell 20 is equal to or higher than the predetermined value (Yes in step 30), the flow may proceed to step 31B. In step 31B, a setting process may be carried out in which the intake-side air is considered and dealt with as dry air, that is, the amount of moisture is zero. Thus, in step 31B, the flow rate of the water vapor contained in the intake-side air may be determined on the basis of the acquired temperature Tfcv of the fuel cell 20.

Thereafter, the same processing as the humidity estimation processing, part 1, as described above may be carried out except that the amount of moisture in the intake-side air is zero.

As described above, in the humidity estimation processing, part 2, the intake-side air flowing into the fuel cell 20 is considered and dealt with as dry gas because the amount of moisture is small in the surroundings of the fuel cell 20 that has reached a high temperature. Hence, it is possible to estimate the humidity Hout in the exhaust-side air by a simpler technique than the humidity estimation processing, part 1.

As described, in the fuel cell system and the method of estimating the humidity in the exhaust gas in this embodiment, it is possible to easily acquire the humidity in the exhaust-side air by using standard components to be equipped in normal FCVs.

Each of the embodiments described above is merely a preferred example of the technology. It should be appreciated that elements of the embodiments described above may be combined as appropriate to provide new structures and new controls, without departing from the scope as defined by the appended claims. In the following, description is given of a modification example applicable to the embodiments described above.

Modification Example

Figure 6:
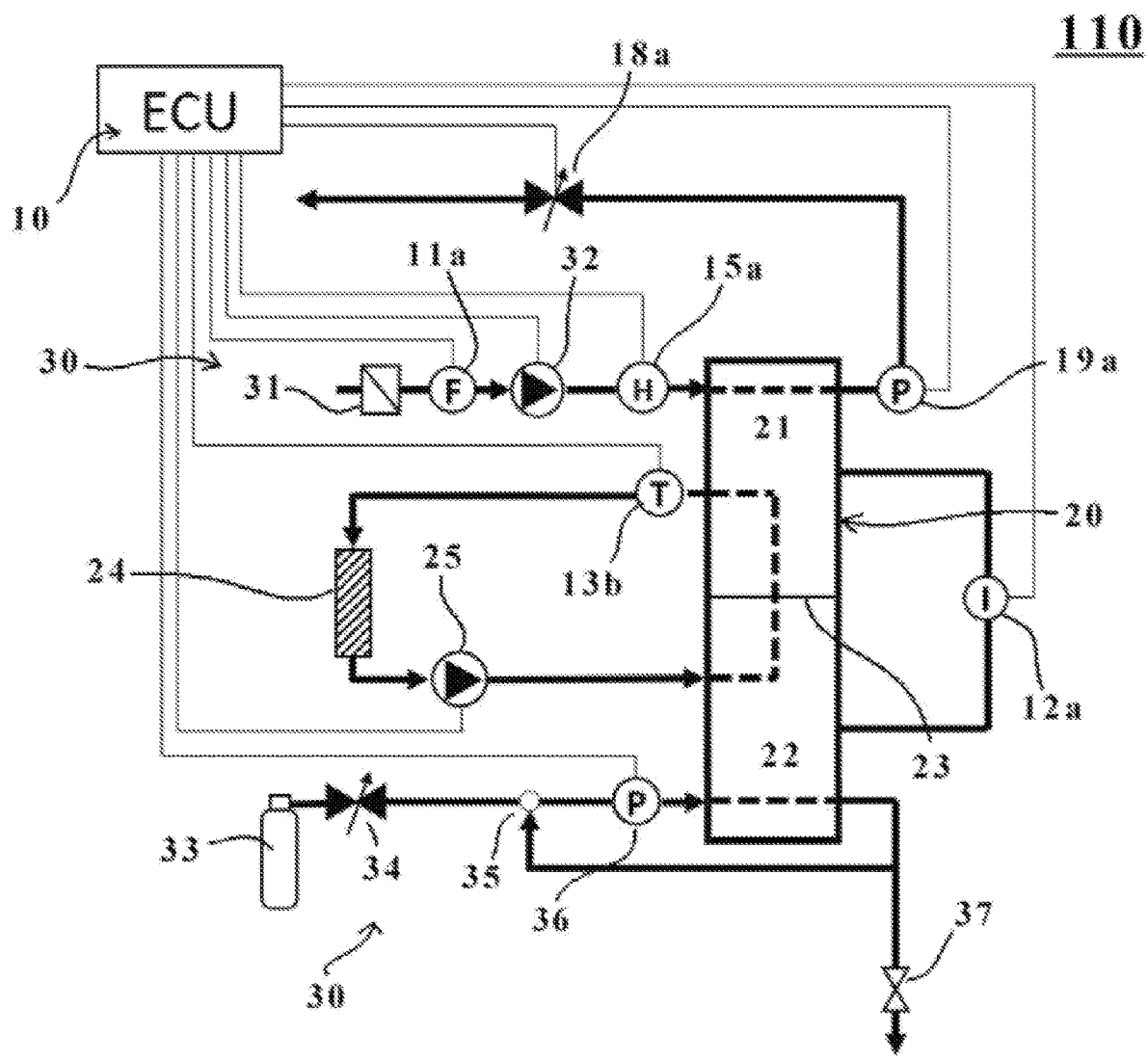
FIG. 6 is an overall block diagram of a fuel cell system according to a modification example.

FIG. 6 illustrates a modification example of the embodiments described above.

As illustrated in the figure, a fuel cell system 110 in the modification example is different from the fuel cell system 100 as described above in that, for example, at least the mass flow rate sensor 11b is eliminated from the exhaust path. That is, in this modification example, the mass flow rate sensor 11b is substituted by what is originally provided in the FCV, e.g., the thermometer 13b, the air pressure regulating valve 18a, and an exhaust side pressure sensor 19a.

In one example, the temperature of the exhaust-side air may be calculated on the basis of the temperature value of the thermometer 13b. The thermometer 13b is configured to detect the temperature of the cooling water to be discharged from the fuel cell 20 as described above. The controller 10 may further acquire an opening degree of the air pressure regulating valve 18a and pressure acquired by the exhaust side pressure sensor 19a, to calculate the mass flow rate WF2 of the exhaust-side air by using a known conversion formula as disclosed in, for example, JP-A No. 2007-172971.

As described above, this modification example renders it unnecessary to provide a dedicated component for the estimation of the humidity in the exhaust-side air. Hence, in addition to the effects of the embodiments as described above, it is possible to further reduce the number of components.

Moreover, in the humidity estimation processing as described above, the humidity estimation processing, part 2 is described as an alternative to the humidity estimation processing, part 1 in which the actual humidity in the intake-side air is measured using the humidity sensor 15a described above. However, the technology is not limited to such examples. In another alternative, for example, the humidity in the intake-side air may be set in advance at a provisional value, e.g., 50%, to treat the provisional value as a provisional fixed value, or alternatively, positional information regarding the vehicle, date and time information, and weather information may be acquired to predict the humidity in the intake-side air on the basis of the season, the weather, or a time zone of the region, or any combination thereof.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to the aspects of the technology, it is possible to acquire the humidity in the exhaust-side air with simple configurations.

The controller 10 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 10 illustrated in FIGS. 1 and 2.

The invention claimed is:

1. A fuel cell system for power generation for a fuel cell including a cathode electrode and a hydrogen electrode opposed to the cathode electrode with a solid polymer electrolyte membrane in between, the fuel cell system comprising:
   a first sensor arranged at an inlet of the fuel cell in an air supply path supplying air to the cathode electrode of the fuel cell, and configured to detect a first mass flow rate of air supplied into the inlet of the fuel cell in the air supply path;
   a second sensor arranged at an outlet of the fuel cell in the air supply path, and configured to detect a second mass flow rate of air exhausted, passing through the cathode electrode, from the outlet of the fuel cell in the air supply path;
   a third sensor arranged at the inlet of the fuel cell in the air supply path, and configured to detect a first humidity of air supplied into the inlet of the fuel cell in the air supply path at the first mass flow rate; and
   a controller coupled with the first sensor, the second sensor, and the third sensor, and configured to calculate a second humidity of air exhausted, passing through the cathode electrode, from the outlet of the fuel cell in the air supply path by:
     calculating a first difference that is mass other than moisture, included in air into the inlet of the fuel cell in the air supply path by using a difference between the first mass flow rate after deducting amount of moisture on a basis of the first humidity and oxygen consumption calculated by using current, detected by an ammeter coupled with the controller, generated by the fuel cell,
     calculating a second difference that is mass of water vapor included in air exhausted from the outlet of the fuel cell in the air supply path by using a difference between the second mass flow rate and the first difference, and
     calculating the second humidity that is a ratio of the second difference to an amount of saturated water vapor corresponding to temperature at the outlet of the fuel cell in the air supply path,
   wherein the controller is configured to humidify, by using a humidifier, air supplied into the inlet of the fuel cell in the air supply path in response to the second humidity.

2. The fuel cell system according to claim 1, wherein the controller is further configured to:
   calculate a flow rate WVout of water vapor in the air exhausted from the fuel cell through the air supply path on a basis of an expression: WF2−(WF1−Ow), in which WF2 denotes the second mass flow rate of the air exhausted from the fuel cell, WF1 denotes the first mass flow rate of the air supplied to the cathode electrode, and Ow denotes the mass flow rate of the oxygen consumption, wherein
   the calculated second humidity in the air exhausted from the fuel cell is calculated on a basis of a ratio of the calculated flow rate WVout of the water vapor to an amount of saturated water vapor in the air exhausted from the fuel cell corresponding to a temperature value of the air exhausted from the fuel cell through the air supply path.

3. The fuel cell system according to claim 2, wherein the controller is further configured to calculate the second humidity of the air by:
   acquiring a temperature of the fuel cell, and
   determining a flow rate of water vapor contained in the air supplied to the cathode electrode on a basis of the acquired temperature of the fuel cell.

4. The fuel cell system according to claim 2, wherein the controller is further configured to calculate the second humidity of the air by:
   measuring an amount of water vapor in the air supplied to the cathode electrode, and
   subtracting a flow rate of water vapor contained in the air supplied to the cathode electrode from the first mass flow rate, on a basis of the measured amount of the water vapor in the air supplied to the cathode electrode.

5. The fuel cell system according to claim 1, wherein the controller is further configured to calculate the second humidity of the air by:
   acquiring a temperature of the fuel cell, and
   determining a flow rate of water vapor contained in the air supplied to the cathode electrode on a basis of the acquired temperature of the fuel cell.

6. The fuel cell system according to claim 1, wherein the controller is further configured to calculate the second humidity of the air by:
   measuring an amount of water vapor in the air supplied to the cathode electrode, and
   subtracting a flow rate of water vapor contained in the air supplied to the cathode electrode from the first mass flow rate, on a basis of the measured amount of the water vapor in the air supplied to the cathode electrode.

7. The fuel cell system according to claim 1, wherein the controller is configured to, in a case where the second humidity is low, humidify, by using the humidifier, air in the inlet of the fuel cell in an air supply path.

8. The fuel cell system according to claim 1, wherein the controller is configured to, in a case where the second humidity is high, perform drying control to dry air in the inlet of the fuel cell in an air supply path.

9. A method of estimating humidity in air exhausted from a fuel cell in a fuel cell system, the fuel cell including a cathode electrode and a hydrogen electrode opposed to the cathode electrode with a solid polymer electrolyte membrane in between, the method comprising:

acquiring, via a first sensor arranged at an inlet of the fuel cell in an air supply path supplying air to the cathode electrode of the fuel cell, a first mass flow rate of the air supplied to the cathode electrode on an intake side of the fuel cell;

acquiring, via a second sensor arranged at an outlet of the fuel cell in the air supply path exhausting air from the fuel cell, a second mass flow rate of the air exhausted, passing through the cathode electrode, from the fuel cell;

acquiring, via a third sensor arranged at the inlet of the fuel cell in the air supply path, a first humidity of air supplied into the inlet of the fuel cell in the air supply path at the first mass flow rate; and calculating a second humidity of air in the air supply path downstream of the solid polymer electrolyte membrane by:

calculating a first difference that is mass other than moisture, included in air into the inlet of the fuel cell in the air supply by using a difference between the first mass flow rate after deducting amount of moisture on a basis of the first humidity and oxygen consumption calculated by using current, detected by an ammeter coupled with the controller, generated by the fuel cell, calculating a second difference that is mass of water vapor included in air exhausted from the outlet of the fuel in the air supply path by using a difference between the second mass flow rate and the first difference, and calculating the second humidity that is a ratio of the second difference to an amount of saturated water vapor corresponding to temperature at the outlet of the fuel cell in the air supply path, wherein the humidity of air in the inlet of the fuel cell in an air supply path is controlled in response to the calculated humidity of air in the air supply path downstream of the solid polymer electrolyte membrane, wherein the controller is configured to, in a case where the second humidity of air in the air supply path downstream of the solid polymer electrolyte membrane is low, perform humidification control to humidify air in the inlet of the fuel cell in an air supply path, and wherein the controller is configured to, in a case where the second humidity of air in the air supply path downstream of the solid polymer electrolyte membrane is high, perform drying control to dry air in the inlet of the fuel cell in an air supply path.

10. The method according to claim 9, wherein
the calculating of the second humidity in the air exhausted from the fuel cell through the air supply path includes:
calculating a flow rate WVout of water vapor in the air exhausted from the fuel cell on a basis of an expression: WF2−(WF1−Ow), in which WF2 denotes the second mass flow rate of the air exhausted from the fuel cell, WF1 denotes the first mass flow rate of the air supplied to the cathode electrode, and Ow denotes the mass flow rate of the oxygen consumption, wherein
the calculating of the second humidity in the air exhausted from the fuel cell is on a basis of a ratio of the calculated flow rate WVout of the water vapor to an amount of saturated water vapor in the air exhausted from the fuel cell corresponding to a temperature value of the air exhausted from the fuel cell.

11. The method according to claim 10, further comprising acquiring a temperature of the fuel cell, wherein
the calculating of the second humidity in the air exhausted from the fuel cell includes determining a flow rate of water vapor contained in the air supplied to the cathode electrode on a basis of the temperature acquired in the acquiring of the temperature of the fuel cell.

12. The method according to claim 10, further comprising measuring an amount of water vapor in the air supplied to the cathode electrode, wherein
the calculating of the second humidity in the air exhausted from the fuel cell includes subtracting a flow rate of water vapor in the air supplied to the cathode electrode from the first mass flow rate, on a basis of the amount of the water vapor in the air supplied to the cathode electrode measured in the measuring of the amount of the water vapor in the air supplied to the cathode electrode.

13. The method according to claim 9, further comprising acquiring a temperature of the fuel cell, wherein
the calculating of the second humidity in the air exhausted from the fuel cell includes determining a flow rate of water vapor contained in the air supplied to the cathode electrode on a basis of the temperature acquired in the acquiring of the temperature of the fuel cell.

14. The method according to claim 9, further comprising measuring an amount of water vapor in the air supplied to the cathode electrode, wherein
the calculating of the second humidity in the air exhausted from the fuel cell includes subtracting a flow rate of water vapor in the air supplied to the cathode electrode from the first mass flow rate, on a basis of the amount of the water vapor in the air supplied to the cathode electrode measured in the measuring of the amount of the water vapor in the air supplied to the cathode electrode.

15. A fuel cell system configured to perform power generation by reaction of oxygen and hydrogen, the fuel cell system comprising:
a fuel cell including a cathode electrode and a hydrogen electrode opposed to the cathode electrode with a solid polymer electrolyte membrane in between;
i) a first sensor at an inlet of the fuel cell in an air supply path supplying air to the cathode electrode of the fuel cell and configured to measure a first mass flow rate of air supplied to the cathode electrode on an intake side of a fuel cell, ii) a second sensor arranged at an outlet of the fuel cell in the air supply path exhausting air from the fuel cell and configured to detect a second mass flow rate of air exhausted from the fuel cell; and iii) a third sensor arranged at the inlet of the fuel cell in the air supply path, and configured to detect a first humidity of air supplied into the inlet of the fuel cell in the air supply path at the first mass flow rate; and
circuitry configured to:
calculate a second humidity of air in the air supply path downstream of the solid polymer electrolyte membrane by:
calculating a first difference that is mass other than moisture, included in air into the inlet of the fuel cell in the air supply by using a difference between the first mass flow rate after deducting amount of moisture on a basis of the first humidity and oxygen consumption calculated by using current, detected by an ammeter coupled with the controller, generated by the fuel cell, calculating a second difference that is mass of water vapor included in air exhausted from the outlet of the fuel in the air supply path by using a difference between the second mass flow rate and the first difference, and calculating the second humidity that is a ratio of the second difference to an amount of saturated water vapor corresponding to temperature at the outlet of the fuel cell in the air supply path, wherein the circuitry is configured to control humidity of air in the inlet of the fuel cell in an air supply path in response to the calculated humidity of air in the air supply path downstream of the solid polymer electrolyte membrane, wherein the circuitry is configured to, in a case where the second humidity of air in the air supply path downstream of the solid polymer electrolyte membrane is high, perform drying control to dry air in the inlet of the fuel cell in an air supply path, and wherein the circuitry is configured to, in a case where the second humidity of air in the air supply path downstream of the solid polymer electrolyte membrane is low, perform humidification control to humidify air in the inlet of the fuel cell in an air supply path.

* * * * *